United States Patent Office 2,861,072
Patented Nov. 18, 1958

2,861,072

PREPARATION OF PIPERAZINE DERIVATIVES

Arthur W. Weston, Waukegan, and Kenneth E. Hamlin, Jr., Lake Bluff, Ill., assignors to Abbott Laboratories, North Chicago, Ill., a corporation of Illinois No Drawing. Application July 19, 1952
Serial No. 299,904

3 Claims. (Cl. 260—268)

Our invention relates to new chemical compounds and more particularly to certain heterocyclic compounds, containing as the essential constituent a N,N'-disubstituted piperazine ring and salts thereof.

The novel compounds of our invention are variously useful. For example, they are generally useful as chemical intermediates, and have been found to possess capacity for producing various physiological effects. It has been observed that some of the compounds according to the invention are useful in combating the symptoms of histamine activity while others show antispasmodic activity when tested on smooth muscle.

The present invention comprises novel compounds containing the piperazine ring and having the following formula:

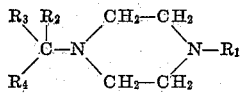

where $R_1$ is hydrogen, an alkyl group containing up to 4 carbon atoms inclusive, an alkanol group containing up to 4 carbon atoms inclusive, a guanyl group, or a dialkylaminoalkyl group containing up to a total of 6 carbon atoms inclusive in all of said alkyl groups; $R_2$ is hydrogen or an alkyl group containing up to 4 carbon atoms inclusive; $R_3$ is an aryl group including substituted aryl groups; $R_4$ is an aryl group including substituted aryl groups, a heterocyclic group or an alicyclic group; and salts of said compounds. When $R_1$ and $R_2$ are both alkyl groups the sum total of carbon atoms in the two groups shall not be more than four.

These compounds may be prepared by treating:

(1) An $R_1$-piperazine

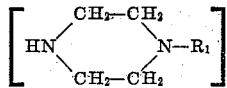

with a compound of the formula

wherein X is a chlorine, bromine or iodine atom;

(2) The treatment of piperazine with a compound of the formula

followed by treatment of the reaction product with a compound of the formula $R_1X$;

(3) Treatment of an N—$(R_2,R_3,R_4$—C)-morpholine of the formula:

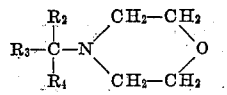

with the compound $R_1NH_2$ under pressure;

(4) Treatment of an N—$(R_2,R_3,R_4$—C)—$\beta,\beta'$-dihalodiethylamine or an N—$(R_2,R_3,R_4$—C)—$\beta,\beta'$-dihydroxydiethylamine with the formula:

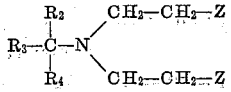

with the compound $R_1NH_2$. In the above formula the Z's are either halogens or hydroxy groups.

(5) Treatment of an N—$(R_2,R_3,R_4$—C)—$\beta,\beta'$-diaminodiethylamine of the formula:

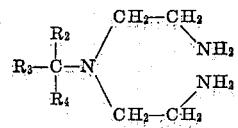

under such conditions of heating as will cause ammonia to split out of the molecule. The group $R_1$ may be introduced by reacting the resulting piperazine compound with an $R_1X$.

(6) Treatment of an N—$(R_2,R_3,R_4$—C)—$\beta$-hydroxy-$\beta'$-aminodiethylamine of the formula:

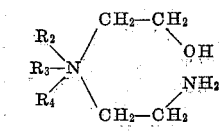

under such conditions of heating as will cause a molecule of water to split out of the intermediate. The $R_1$-group may be introduced by reacting the resulting compound with an $R_1X$.

(7) Treatment of an N—$(R_2,R_3,R_4$—C)—$\beta,\beta'$-di $R_1$-diaminodiethylamine of the formula:

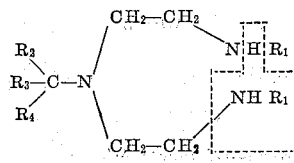

under such conditions of heating as will cause $R_1$-amine to split out and form the corresponding $R_1$-substituted piperazine.

(8) Treatment of an N—$(R_2,R_3,R_4$—)-amine with an N—$R_1$-$\beta,\beta'$-dihalodiethylamine as indicated in the following reaction:

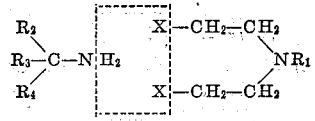

to split out two moles of hydrohalic acid and produce the corresponding N—$R_1$—N'—$(R_2,R_3,R_4$—C)-piperazine.

(9) Treatment of the N-monoacyl derivative of piperazine in which the acyl group contains up to four carbon atoms inclusive; with an $(R_2,R_3,R_4$—C)-halide followed by reduction of the acyl group to the corresponding alkyl group with a reducing agent such as formic acid or lithium aluminum hydride.

(10) The final compounds of the invention may also be prepared where $R_1$ is methyl or ethyl from an N—$(R_2,R_3,R_4,C)$-piperazine with the formula:

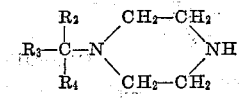

by reacting this compound with either formaldehyde or acetaldehyde in conjunction with formic acid in which case the substituted $R_1$ is methyl or ethyl respectively.

The polymer of formaldehyde, paraformaldehyde or formalin, may be used in place of formaldehyde.

(11) Compounds with the formula $$R_3-\underset{R_4}{\underset{|}{\overset{R_2}{\overset{|}{C}}}}-N\underset{CH_2-CH_2}{\overset{CH_2-CH_2}{<}}NH$$

which are valuable both therapeutically and as intermediates for the preparation of the final compounds of the invention where $R_1$ is an alkyl group, an alkanol, a guanyl or an dialkylaminoalkyl group, may be prepared by reacting an N-carbalkoxypiperazine with the compound of the formula $(R_2,R_3,R_4-C)-X$ to produce the $$N-(R_2,R_3,R_4,C)-N'\text{-carbalkoxypiperazine}$$

This product is then hydrolyzed and decarboxylated to produce the $N-(R_2,R_3,R_4,C)$-piperazine.

In process (3) above the $N-(R_2,R_3,R_4,C)$-morpholine may be produced by two processes (a) reaction of an $(R_2,R_3,R_4,C)$-halide with morpholine; (b) the treatment of an $(R_2,R_3,R_4,C)$-amine with a $\beta,\beta'$-dihalodiethyl ether.

In process (4) above the compound N,N-($\beta,\beta'$-dihalodiethyl)-N-$(R_2,R_3,R_4,C)$-amine has been prepared by reacting diethanolamine with a $(R_2,R_3,R_4,C)$-halide to produce the $N-(R_2,R_3,R_4,C)$-diethanolamine. This compound is treated with a hydrohalic acid to produce the dihalide. One may also use the $N-(R_2,R_3,R_4,C)$-diethanolamine directly with the $R_1$-amine to obtain results which are moderately satisfactory.

In the above formula $R_1$, $R_2$, $R_3$, $R_4$ and X have the same definition as given previously. In methods (1) and (2) the presence of an alkaline material to neutralize the acid formed from the reaction may be advantageous.

Our invention also comprises the novel processes for preparing the novel N,N'-substituted piperazines of the invention.

In preparing the compounds of the invention it is obvious that one may introduce either of the two nitrogen substituents last to come within the scope of the present invention.

The invention may be illustrated by the following examples:

EXAMPLE I

*N-(p-chlorobenzhydryl)-N'-methylpiperazine*

A mixture of about 11.9 g. of p-chlorobenzhydryl chloride, 5.0 g. of N-methylpiperazine and 5.3 g. of sodium carbonate in 75 cc. of anhydrous xylene is refluxed and stirred for about 60 hours. The hydrocarbon layer is then extracted several times with dilute hydrochloric acid, the acidic washings combined and made alkaline with sodium hydroxide. The ether extracts of the resulting oil are combined, dried and the dihydrochloride salt precipitated by the addition of gaseous hydrogen chloride to the solution. The pure N-(p-chlorobenzhydryl)-N'-methyl-piperazine dihydrochloride melts at 220–221° C. after crystallization from a mixture of absolute alcohol-ether. By the addition of only one equivalent of hydrogen chloride, the monohydrochloride salt is formed which melts at 223–224° C. after crystallization from absolute alcohol.

EXAMPLE II

*N-(p-bromobenzhydryl)-N'-methylpiperazine*

Using about 14 g. of p-bromobenzhydryl chloride, 5 g. of N-methylpiperazine and 5.3 g. of sodium carbonate and following the procedure outlined in Example I, the above mentioned compound may be prepared. This compound has a boiling point of 161–171° C. at 0.5 mm. The dihydrochloride melts at 249–250° C. after purification from absolute alcohol.

EXAMPLE III

*N-Benzhydryl-N'-methylpiperazine*

In the manner outlined in Example I, 7 g. of N-methylpiperazine and 14 g. of benzhydryl chloride are converted to N-benzhydryl-N'-methylpiperazine. Ethyl alcohol is used in place of the hydrocarbon solvent and the product is first isolated as the free base, M. P. 105–108° C. After conversion to the dihydrochloride and recrystallization from absolute ethanol, the salt melts at 258–260° C.

EXAMPLE IV

*N-(p-Methoxybenzhydryl)-N'-methylpiperazine*

Similarly, by employing 11.6 g. of p-methoxybenzhydryl chloride, 5.0 g. of N-methylpiperazine and 5.3 g. of sodium carbonate and following the procedure described in Example I, the dihydrochloride of N-(p-methoxybenzhydryl)-N'-methylpiperazine is obtained. The pure product melts at 194–195° C. after crystallization from an isopropyl alcohol-ether mixture. The free base has a boiling point of 168–169° C. at 0.7 mm.

EXAMPLE V

*N-(p,p'-Dichlorobenzhydryl)-N'-methylpiperazine*

By employing 13.6 g. of p,p'-dichlorobenzhydryl chloride, 5.0 g. of N-methylpiperazine and 5.3 g. of sodium carbonate and following the procedure described in Example I, the dihydrochloride salt of N-(p,p'-dichlorobenzhydryl)-N'-methylpiperazine is produced. By crystallization of the crude material from alcohol, the pure product M. P. 245–246° C. is obtained.

EXAMPLE VI

*N-benzhydryl-N'-(β-hydroxyethyl)-piperazine*

In a similar manner to that of Example I, 6.5 g. of N-(β-hydroxyethyl)-piperazine, 10.1 g. of benzhydryl chloride, 5.3 g. of sodium carbonate and 100 cc. of dry xylene are refluxed twelve hours to yield the free base which is converted to 9.8 g. of N-benzhydryl-N'-(β-hydroxyethyl)-piperazine dihydrochloride, M. P. 229° C. with decomposition.

EXAMPLE VII

*N-benzhydryl-N'-ethylpiperazine*

To a suspension of 1.8 g. of sodamide in 100 cc. of dry toluene containing dissolved ammonia is added 9.4 g. of N-ethylpiperazine dihydrochloride. The mixture is heated on a steam bath for one hour and then 12.4 g. of benzhydryl bromide in 25 cc. dry toluene is added dropwise. The reaction mixture is then refluxed for 5 hours. After cooling, water is added and the reaction product is extracted with ether. The ether extracts are in turn extracted with dilute hydrochloric acid and the acid layer made alkaline with 40% sodium hydroxide. The oil which separates is extracted with ether and the ether extracts dried. The ether solution on treatment with ethereal hydrogen chloride yields the dihydrochloride of N-benzhydryl-N'-ethylpiperazine, M. P. 241° C. with decomposition.

EXAMPLE VIII

*N-benzhydryl-N'-(β-dimethylaminoethyl)-piperazine*

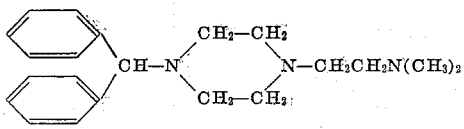

To 0.021 mole of methyl lithium dissolved in 35 cc. of anhydrous ether, a solution of 4.7 g. of N-benzhydryl-piperazine in 25 cc. of anhydrous ether is slowly added. This mixture is refluxed for four hours. Then a solution of 2.15 g. of β-dimethylaminoethyl chloride in 25 cc. of ether is added dropwise, the mixture stirred and refluxed overnight and finally added cautiously to ice water. The acid extracts of the ether layer are combined with the original water layer, made strongly alkaline and the resulting oil taken up in ether which is then dried over sodium sulfate. The residue from concentration of the ether solution is distilled at 0.7 mm. There is thus obtained an oil boiling at 158–162° C. The addition of two equivalents of hydrogen chloride gas to an ether solution of the base yields the dihydrochloride salt of N-benzhydryl-N'-(β-dimethylaminoethyl)-piperazine which melts at 255–257° C., with decomposition, after crystallization from an isopropyl alcohol-ether mixture.

EXAMPLE IX

*N-(p-iodobenzhydryl)-N'-methylpiperazine*

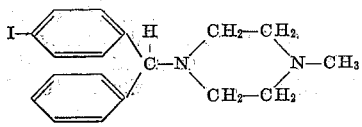

A mixture of 5.0 gms. of p-iodobenzhydryl chloride, 2.0 gms. of N-methylpiperazine and 1.6 gms. of sodium carbonate in 100 cc. of xylene is condensed according to the process of Example I. The product is N-(p-iodobenzhydryl)-N'-methylpiperazine which boils at 181° C. at 0.5 mm. pressure. The monohydrochloride salt melts at 260–261° C.

EXAMPLE X

*N-benzhydrylpiperazine*

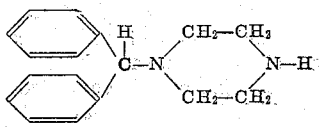

A mixture of 14 g. of N-benzhydryl-N'-carbethoxy-piperazine and 56 g. of potassium hydroxide in 250 cc. of 95% ethanol is refluxed for 22 hours. After removal of the alcohol in vacuo, the residue is treated with water and extracted with ether. The ether extract is dried and then distilled. The benzhydrylpiperazine distills at 183–190° C. at 1 mm. pressure and then crystallizes, M. P. 70–72° C.; the base is converted to the d-tartaric acid salt, M. P. 195° C. with decomposition after recrystallization from absolute ethanol.

EXAMPLE XI

*N-[α-(2-pyridyl)-benzyl]-N'-methylpiperazine*

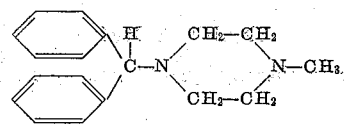

By following the process of Example I and using α-(2-pyridyl)-benzyl chloride, N-methylpiperazine and sodium carbonate, the above mentioned compound is prepared. It melts at 95–97° C. after sublimation.

EXAMPLE XII

*N-(p-fluorobenzhydryl)-N'-methylpiperazine*

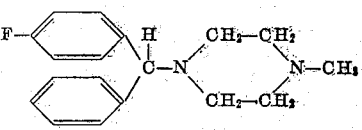

Following the procedure in Example I using 11 g. of p-fluorobenzhydryl chloride, 5 g. of N-methylpiperazine and 5.3 g. of sodium carbonate, the above-mentioned compound is obtained. This compound has a boiling point of 140–141° C. at 0.6 mm. pressure. The monohydrochloride of this product has a melting point of 230–231° C.

The free base has a boiling point of 140–141° C. at 0.6 mm.

EXAMPLE XIII

*N-(p-methylbenzhydryl)-N'-methylpiperazine*

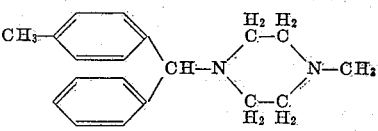

By employing about 10.8 g. of p-methylbenzhydryl chloride, 5.0 g. of N-methylpiperazine, 5.3 g. of anhydrous sodium carbonate in 100 cc. of dry xylene and refluxing the mixture sixty hours, there is obtained the product represented by the above structural formula which boils at 159–160° C. at 1 mm. By adding one equivalent of hydrogen chloride gas to an absolute alcohol solution of the base, the monohydrochloride salt of the above base is formed. It melts at 228–229° C. after crystallization from absolute alcohol.

EXAMPLE XIV

*N-(α-cyclohexyl-p-chlorobenzyl)-N'-methylpiperazine*

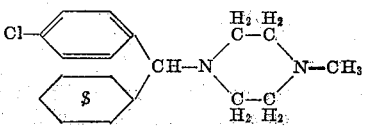

Following the procedure of Example XIII, about 12.2 g. of α-cyclohexyl-p-chlorobenzyl chloride, 5.0 g. of N-methylpiperazine, and 5.3 g. of anhydrous sodium carbonate in 100 cc. of dry xylene are converted to the product represented by the above formula. The dihydrochloride salt melts at 278–279° C. (dec) after crystallization from alcohol.

EXAMPLE XV

*N-(p-chlorobenzhydryl)-N'-ethylpiperazine*

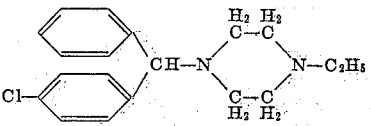

Following the procedure outlined in Example XIII, about 11.8 g. of p-chlorobenzhydryl chloride, 5.7 g. of N-ethylpiperazine and 5.3 g. of sodium carbonate are reacted to form N-(p-chlorobenzhydryl)-N'-ethylpiperazine. This is converted to the dihydrochloride which after recrystallization from ethanol-ether melts at 227.5–228° C.

EXAMPLE XVI

*N-(o-chlorobenzhydryl)-N'-methylpiperazine*

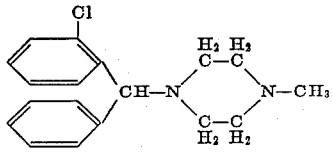

A mixture of about 11.8 g. of o-chlorobenzhydryl chloride, 5 g. of N-methylpiperazine, and 5.3 g. of anhydrous sodium carbonate are allowed to react according to the procedure outlined in Example XIII. The product formed has the above structure. The monohydrochloride salt melts at 272–273° C. after crystallization from absolute alcohol. The free base has a boiling point of 179–180° C. at 2.0 mm.

EXAMPLE XVII

*N-(α-2-thienylbenzyl)-N'-methylpiperazine*

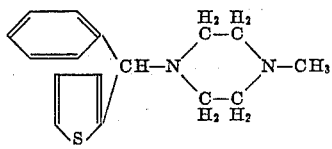

A solution of about 10 g. of N-methylpiperazine in 100 cc. of anhydrous ether is treated with a solution of 10.5 g. of α-2-thienylbenzyl chloride in 50 cc. of ether. After standing 24 hours the mixture is filtered to remove the N-methylpiperazine dihydrochloride. After extraction of the filtrate with dilute hydrochloric acid, the acid extracts are made alkaline with 30% potassium hydroxide and the product is extracted with ether. The ether extract is dried and the solution is treated with hydrogen chloride gas to form the dihydrochloride of N-(α-2-thienylbenzyl)-N'-methylpiperazine. This salt melts at 202° C. with decomposition after recrystallization from ethanol-pentane.

EXAMPLE XVIII

*N-benzhydryl-N'-n-butylpiperazine*

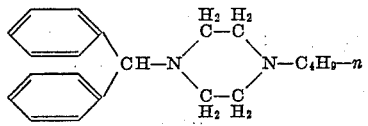

By the method outlined in Example XIII, about 9.9 g. of benzhydryl bromide, 5.6 g. of N-n-butylpiperazine and 4.2 g. of sodium carbonate is converted to N-benzhydryl-N'-n-butylpiperazine. The dihydrochloride salt is made from the base and melts at 248° C. with decomposition after recrystallization from a methanol-acetone mixture.

EXAMPLE XIX

*N-(p-chlorobenzhydryl)-N'-n-butylpiperazine*

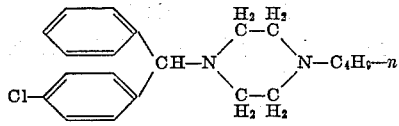

In a similar manner to that of Example XIII, about 9.5 g. of p-chlorobenzhydryl chloride, 5.6 g. of N-n-butylpiperazine and 4.2 g. of sodium carbonate form N-(-p-chlorobenzhydryl)-N'-n-butylpiperazine. The free base is converted to its dihydrobromide which after recrystallization from isopropanol melts at 253.5–255° C. with decomposition.

EXAMPLE XX

*N-(m-chlorobenzhydryl)-N'-methylpiperazine*

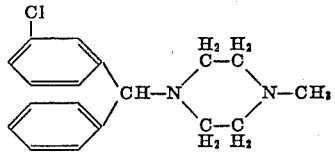

In a similar fashion to Example XIII, about 11.8 g. of m-chlorobenzhydryl chloride, 5.0 g. of N-methylpiperazine and 5.3 g. of anhydrous sodium carbonate in 100 cc. of dry xylene react to form the product represented by the above formula. It boils at 177° C. at 1.5 mm. The monohydrochloride salt melts at 249–250° C. after recrystallization from absolute alcohol.

EXAMPLE XXI

*N-benzhydryl-N'-methylolpiperazine*

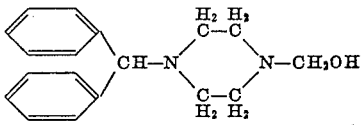

A solution of about 1.8 g. of N-benzhydrylpiperazine and 2.2 cc. of 35% formalin in 25 cc. of 50% aqueous methanol is heated for fifteen minutes. The supernatant liquid is decanted from the insoluble oily product which is taken up in warm alcohol containing dissolved hydrogen chloride gas. The crystals which separate on cooling the resulting solution melt at 189–190° C. after crystallization from an absolute alcohol-ether mixture.

EXAMPLE XXII

*N-(α-2-thienyl-p-chlorobenzyl)-N'-methylpiperazine*

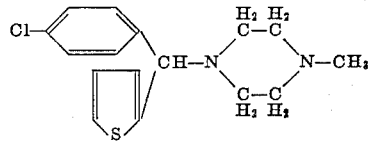

Following the method outlined in Example XIII, about 10 g. of N-methylpiperazine, 12.2 g. of α-2-thienyl-p-chlorobenzyl chloride in 150 cc. of anhydrous ether are converted to N-(α-2-thienyl-p-chlorobenzyl)-N'-methylpiperazine. The dioxalate, prepared by treating the free base with ethereal oxalic acid, melts at 216° C. with decomposition.

EXAMPLE XXIII

*N-(p-chlorobenzhydryl)-N'-(4-hydroxy-n-butyl)-piperazine*

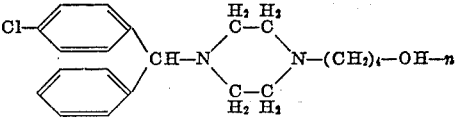

In a similar manner to that of Example XIII, 4 g. of p-chlorobenzhydryl chloride, 2.7 g. of N-(4-hydroxy-n-butyl)-piperazine and 1.8 g. of sodium carbonate are reacted to obtain N-(p-chlorobenzhydryl)-N'-(4-hydroxy-n-butyl)-piperazine. The base is converted to the dihydrochloride salt which melts at 211–212° C. with decomposition after recrystallization from ethanol-ether.

EXAMPLE XXIV

*N-(α-methylbenzhydryl)-N'-methylpiperazine*

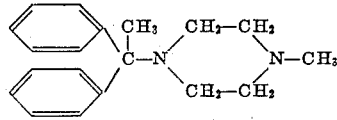

To a refluxing suspension of 19.3 g. of di-(β-chloroethyl)-methylamine hydrochloride and 48.3 g. of anhydrous potassium carbonate in 100 cc. of methanol, there is added slowly 19.7 g. of α,α-diphenylethylamine. The mixture is stirred and refluxed for eighteen hours, then cooled and filtered, and the solid washed well with methanol and ether. The alcohol ether filtrate is concentrated, treated with dilute hydrochloric acid and then extracted with ether. The acidic solution is made alkaline and the resulting oil taken up in ether, dried and concentrated. Distillation gives the desired product, B. P. 162–165° C. at 0.7 mm. The dihydrochloride monohydrate salt, prepared in the usual manner, melts at 203–205° C. after crystallization from absolute alcohol.

EXAMPLE XXV

*N-benzhydryl-N'-guanylpiperazine*

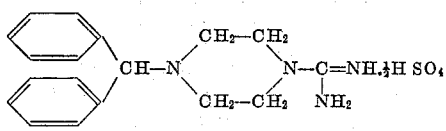

To 2.52 g. of N-benzhydrylpiperazine, 1.38 g. of S-methylisothiourea sulfate in 20 cc. of boiling alcohol, sufficient water is added to form a clear solution which is then refluxed for three hours. The pure N-benzhydryl-N'-guanylpiperazine sulfate which separates on cooling is removed by filtration. It melts at 294–295° C. with decomposition.

It has also been found that alkylhalide salts of the bases of the compounds of the invention are satisfactory for use as medicinals. The following example will illustrate the preparation of one of these quaternary ammonium salts.

EXAMPLE XXVI

*N-(p-chlorobenzhydryl)-N'-methylpiperazine methiodide*

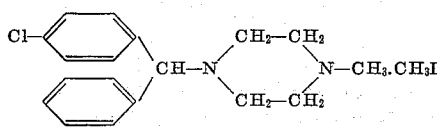

By allowing a solution of 1.5 g. of N-(p-chlorobenzhydryl)-N'-methylpiperazine and 0.71 g. of methyliodide in 10 cc. of ether to stand, the quaternary salt is formed and separates as a solid. It melts at 119–120° C. (dec.) after recrystallization from absolute alcohol.

EXAMPLE XXVII

*N-(p-chlorobenzhydryl)-N-methylpiperazine*

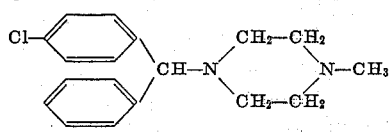

A mixture of 4.7 g. of N-(p-chlorobenzhydryl)-bis-(β-chloroethyl)-amine hydrochloride, 8 cc. of 30% aqueous methylamine and 8 cc. of alcohol are heated in a bomb at 140° C. for seventeen hours. The reaction mixture is dissolved in water, then alkali is added. The resulting oil is extracted with ether which is then dried and concentrated. Distillation of the residual oil gave a product possessing the above structure. This material boils at 150–152° C. at 0.1 mm. and forms a monohydrochloride which melts at 223–224° C. (dec.), which is identical with the product described in Example I.

It has been found that the addition of the trace of an alkali metal halide, such as sodium iodide, will reduce the reaction time for the preparation of the compounds of the invention, wherein the (R₂,R₃,R₄-C)-halide is reacted with the R₁-substituted piperazine. The compounds are produced in excellent yields by this modification of the process.

It has also been found that excellent results are obtained by using n-butanol as the solvent for the (R₂,R₃,R₄-C)-halide and the R₁-substituted piperazine.

Compounds have also been prepared in which R₁ is an alkyl group containing up to four carbon atoms inclusive such as propyl, isopropyl, and isobutyl. Examples of these compounds are: N-benzhydryl-N'-isopropyl-piperazine and N-benzhydryl-N'-(n-isobutyl)-piperazine. R₁ may also be an alkanol group containing up to 4 carbon atoms inclusive or a dialkylamino-alkyl group with up to a total of four carbon atoms inclusive in all of said alkyl groups. Illustrative of these compounds are: N-benzhydryl-N'-(γ-hydroxypropyl)-piperazine and the other alkanol compounds of the preceding examples, N-benzhydryl-N'-(δ-dimethylaminobutyl)-piperazine and N-benzhydryl-N'-(β-diethylaminoethyl)-piperazine. Also R₂ may be an alkyl group containing up to four carbon atoms inclusive such as methyl, ethyl, propyl and butyl. Illustrative of these compounds are: N-(α-ethylbenzhydryl)-N'-methylpiperazine, and N-(α-n-butylbenzhydryl)-N'-methylpiperazine. R₃ and R₄ may be aryl groups of the monocyclic aromatic hydrocarbon type, such as halogenated phenyl groups, alkylated groups and alkoxyaryl groups etc. Illustrative of these compounds are N-(p,p'-diiodobenzhydryl)-N'-methylpiperazine, N-(o,o'-dichlorobenzhydryl)-N'-methylpiperazine, N-(p-chloro-p'-bromobenzhydryl)-N'-methylpiperazine, N-(p-bromo-p'-methoxy-benzhydryl)-N'-methylpiperazine, N-(p-chloro-p'-methylbenzhydryl)-N'-methylpiperazine, N-(p,p'-dimethylbenzhydryl)-N'-methylpiperazine, N-(p,p'-dimethoxybenzhydryl)-N'-methylpiperazine. R₄ may also be a heterocyclic group having 5 and 6 membered rings and one heterocyclic atom such as a pyrimidine ring, and a furane ring or an alicyclic group of the cyclo paraffin type, such as cyclopropyl, cyclopentyl, and cyclohexyl. Illustrative of these compounds are: N-[α-(2-pyrimidyl)-benzyl] - N' - methylpiperazine, N - [α - (2 - furyl)-benzyl]-N'-methylpiperazine and N-(α-cyclopentyl)-benzyl-N'-methylpiperazine. These products are prepared using the proper intermediates in accordance with the processes described above.

The following examples are illustrative of the various alternative methods for preparing the intermediates for the final compounds of the invention.

EXAMPLE XXVIII

*N-(p-chlorobenzhydryl)-N'-carbethoxypiperazine*

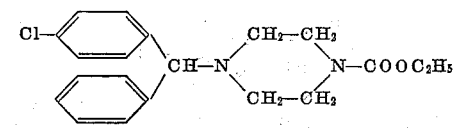

A mixture of 12.6 g. of N-carbethoxypiperazine, 18.96 g. of p-chlorobenzhydryl chloride, 7.0 g. of sodium bicarbonate and 100 cc. of dry toluene is refluxed and stirred sixteen hours. After the addition of water, the hydrocarbon layer is dried and hydrogen chloride gas added. The dihydrochloride of the N-(p-chlorobenzhydryl)-N'-carbethoxypiperazine is thus obtained as a white solid.

This type of compound is useful in the synthesis which removes the N-carbethoxy group by hydrolysis and decarboxylation. For example, by refluxing the above-mentioned compound with concentrated hydrochloric acid, the compound N-p-chlorobenzhydrylpiperazine is obtained.

EXAMPLE XXIX

*N-benzhydryl-N'-carbethoxypiperazine*

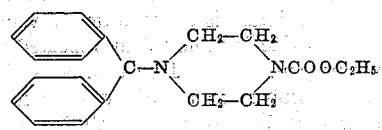

In a similar manner to the procedure of Example XIII, 29.8 g. of N-carbethoxypiperazine, 46.5 g. of benzhydryl bromide, 21.2 g. of sodium carbonate and 125 cc. of xylene are refluxed 4 hours to yield N-benzhydryl-N'-carbethoxy-piperazine, M. P. 114° C.

As indicated in Example XXVIII, the above compound may be treated to split out the carbethoxy group to produce N-benzhydrylpiperazine.

EXAMPLE XXX

*N-carbethoxy-N'-(4-hydroxybutyl)-piperazine*

$$HO-CH_2CH_2CH_2-CH_2-N\begin{matrix}CH_2-CH_2\\ \\CH_2-CH_2\end{matrix}N-COOC_2H_5$$

According to the above example, a mixture of 47.4 g. of N-carbethoxypiperazine, 32.6 g. of tetramethylene-chlorohydrin, 31.8 g. of sodium carbonate and 150 cc. of anhydrous ethanol is refluxed for 5 hours to yield N-carbethoxy-N'-(4-hydroxybutyl)-piperazine, B. P. 165–168° C. at 0.4 mm. The monohydrochloride salt of the base melts at 118–119° C. after recrystallization from ethanol-ether. This compound may be used in the preparation of the compound of Example XXXXII.

EXAMPLE XXXI

*p-Fluorobenzhydryl chloride*

F—C₆H₄—CH—Cl—C₆H₅

A solution of 82 gms. of p-fluorobenzhydrol in a mixture of 50 cc. each of n-hexane (Skelly B) and benzene is mixed with an excess of solid calcium chloride and treated with hydrogen chloride gas. The temperature is maintained at 12–25° C. by cooling the flask in ice. When the reaction is complete as evidenced by the fall in temperature, the solution is poured over a fresh batch of calcium chloride and the process repeated in 15 minutes. The solution is filtered, concentrated and the residue distilled with the p-fluorobenzhydryl chloride having a boiling point of 125–127° C. at 1 mm. pressure.

EXAMPLE XXXII

*p-Iodobenzhydryl chloride*

I—C₆H₄—CH—Cl—C₆H₅

In a manner similar to Example XXXI but using 7.0 gms. of p-iodobenzhydrol the above compound is obtained. The compound has a boiling point of 148–149° C. at 0.6 mm. pressure.

EXAMPLE XXXIII

*α-(2-pyridyl)-benzyl chloride*

A cooled mixture of 24 g. of α-2-pyridylbenzyl alcohol hydrochloride in 200 cc. of anhydrous benzene is treated with 36 g. of thionyl chloride. The resulting solution is stirred for an additional hour and then allowed to stand at room temperature for 15 hours. After heating at 60° C. for 1 hour, the mixture is concentrated in vacuo. The excess thionyl chloride is removed by repeated additions of anhydrous benzene followed by distillation in vacuo. The residue is dissolved in a little water and is made strongly alkaline with a saturated solution of sodium carbonate. After extraction of the liberated chloride with ether, the ether extract is dried and distilled. α-2-pyridyl-benzyl chloride is obtained, B. P. 126–131° C. at 0.3 mm.

EXAMPLE XXXIV

*α-Cyclohexyl-p-chlorobenzyl chloride*

In a similar manner to that of Example XXXI, 25 g. of p-chlorophenyl cyclohexyl carbinol yields the above chloride on treatment with hydrogen chloride gas. The product boils at 134–136° C. at 1.6 mm.

EXAMPLE XXXV

*α-(2-thienyl)-p-chlorobenzyl chloride*

In accordance with the procedure of Example XXXI, 11.2 g. of α-2-thienyl-p-chlorobenzyl alcohol in 150 cc. of anhydrous ether is treated with gaseous hydrogen chloride in the presence of anhydrous calcium chloride. The product obtained has the above structural formula. This compound is an unstable oil which decomposes upon distillation. It is therefore used in the next step of the process without further purification.

EXAMPLE XXXVI

*N-(p-chlorobenzhydryl)-bis-(β-chloroethyl)-amine*

A solution of 11.6 g. of N-(p-chlorobenzhydryl)-diethanolamine and 50 cc. of thionyl chloride in 300 cc. of chloroform is refluxed one hour. Removal of the solvent leaves an oil which slowly solidifies. By crystallizing this material from an absolute alcohol-ether mixture, the hydrochloride of the above structure is obtained. It melts at 135–137° C.

EXAMPLE XXXVII

*N-(p-chlorobenzhydryl)-diethanolamine*

A mixture of 23.7 g. of p-chlorobenzhydryl chloride, 10.5 g. of diethanolamine, 10.6 g. of sodium carbonate and 150 cc. of dry toluene is refluxed forty hours. The supernatant liquid is decanted from the solid material, then concentrated leaving a yellow oil which is distilled. The product of the above structure boils at 197–207° at 0.1 mm. This compound is an intermediate for the preparation of the compound of Example XXXVI.

EXAMPLE XXXVIII

*p-Chlorophenyl cyclohexyl carbinol*

An ether solution of 70.3 g. of p-chlorobenzaldehyde is added to the Grignard reagent prepared from 114.1 g. of cyclohexyl bromide and 14.4 g. of magnesium metal and the mixture refluxed two hours. The addition complex which forms is decomposed with an ammonium chloride solution and the above carbinol is extracted with ether. The ether is removed by distillation and the resulting carbinol boils at 122 to 125° C. at 0.7 mm. Upon standing the carbinol solidifies and melts at 70 to 71° C. after crystallization from n-hexane. This compound is an intermediate for the preparation of the compound of Example XXXIV.

EXAMPLE XXXIX

α-(2-thienyl)-p-chlorobenzyl alcohol

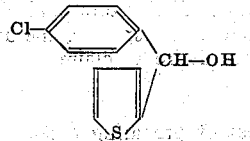

Following the procedure given in Example XXXVII, 191 g. of p-chlorobromobenzene, 24 g. of magnesium turnings and 112 g. of α-thiophenealdehyde are reacted to form α-2-thienyl-p-chlorobenzyl alcohol, B. P. 157–158° C. at 0.3 mm. After distillation, this alcohol becomes a solid, melting at 59.5–60° C. This compound serves as an intermediate for the preparation of the compound of Example XXXV.

EXAMPLE XXXX

α-Methylbenzhydrylamine

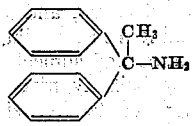

A solution of alkaline hypobromite is prepared by dissolving 33.6 g. of bromine in an ice-cold solution of 82 g. of potassium hydroxide in 425 cc. of water. After 45 g. of α,α-diphenylpropionamide is added, the mixture is stirred at 0° for one hour, then gradually allowed to warm to room temperature. The resulting solution is finally warmed on the steam bath for one-half hour whereby a yellow oil separates which is extracted with ether. The dried extracts are concentrated and the residue distilled. There is thus obtained α,α-diphenylethylamine B. P. 140–142° at 4 mm. The hydrochloride salt melts at 245–246° C. This compound is an intermediate for the preparation of the compound of Example XXV.

EXAMPLE XXXXI

N-n-butylpiperazine

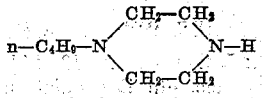

Hydrolysis of N-carbethoxy-N'-n-butylpiperazine is accomplished by treating 33 g. of this base with 170 cc. of concentrated hydrochloric acid and refluxing for 42 hours. After concentration in vacuo, the residue is dissolved in a little water and is made strongly alkaline with 50% potassium hydroxide solution. The resulting oily layer is extracted with ether, is dried and distilled. The N-n-butylpiperazine boils at 192–195° at 747 mm. This compound is an intermediate for the preparation of the compounds of Examples XVIII and XIX.

EXAMPLE XXXXII

N-(4-hydroxybutyl)-piperazine

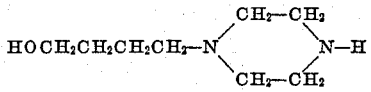

As described in Example XXXXI, 24 g. of N-carbethoxy-N'-(4-hydroxybutyl)-piperazine is hydrolyzed with 100 cc. of concentrated hydrochloric acid to yield N-(4-hydroxybutyl)-piperazine, B. P. 142° at 6 mm. This compound is an intermediate for the preparation of the compound of Example XXIII.

EXAMPLE XXXXIII

N-p-chlorobenzohydrylmorpholine

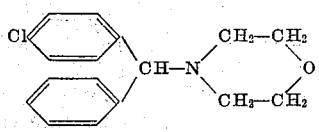

23.7 of p-chlorobenzohydrylchloride is added to 43.6 g. of morpholine and the mixture is mixed well and allowed to stand at room temperature for three days, during which time a precipitate of white needles formed.

The mixture is heated on steam for two hours, allowed to cool, and poured into 200 cc. of water. The resulting white mixture is shaken with 100 cc. of ether. The ethereal extract is shaken once with 50 cc. of water, which was discarded, and then with 175 cc. of 3 N HCl. The aqueous layer is separated and made strongly basic with 25% aqueous NaOH. The oil which separated is extracted by two 150 cc. portions of ether and the extract was dried over $MgSO_4$. The solvent is evaporated, and the residue distilled. The product distills as a viscous oil at 162–165° C. at 0.3 mm.

The above product may be used to produce compounds according to the invention by treating with an $R_1$ amine under pressure.

The N,N'-disubstituted piperazines according to the invention are usually more soluble in water as salts and are therefore administered in the form of water-soluble salts when a rapid effect is desired. Any acid which produces a water-soluble salt and does not appreciably enhance the toxicity is suitable for use. Such acids as sulphuric, phosphoric, hydrochloric, hydrobromic, levulinic, acetic, tartaric and oxalic are among those which are satisfactory. Where a retarded effect is desired in obtaining the therapeutic results, salts of other non-toxic acids, such as tannic acid, which are very sparingly soluble in water, may be used. By using the latter salts the desired pharmacological effect will be slow in onset and relatively long in duration. The water-soluble salts of these compounds of the invention may be satisfactory administered in the form of water solutions. The bases and water-insoluble salts such as the tannic acid salt as well as the water soluble salts may be administered in the form of tablets and capsules. The following examples will illustrate these preparations:

EXAMPLE XXXXIV

N-(p-chlorobenzhydryl)-N'-methylpiperazine mono-
hydrochloride _____ gms__ 2
Distilled water, q. s. _____cc__ 100

This formula produces an aqueous solution containing 20 mgs. of medicament per cc. The compounds of the invention may be dispensed in aqueous solution in suitable concentrations according to this example.

EXAMPLE XXXXV

The salts of the therapeutic compounds according to the present invention may also be dispersed in the usual tablet and capsule bases and dispensed in tablet or capsule form. Convenient concentrations are 10, 25, 50 or 100 mgs. per tablet or capsule.

EXAMPLE XXXXVI

N-(p-chlorobenzhydryl)-N'-methylpiperazine

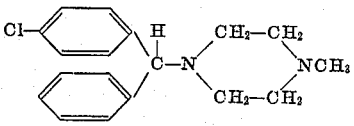

A mixture of 30 g. of N-(p-chlorobenzhydryl) piperazine 10.3 g. of formaldehyde (35%) and 7.6 g. of formic acid (90%) is placed in a round bottom flask and heated on a steam bath for three hours and thereafter refluxed for four and one-half hours. Concentrated hydrochloric acid (7.7 g.) is added and the excess formaldehyde and formic acid removed by distillation at reduced pressure. The residue is dissolved in water and made alkaline by the addition of a solution of 40% sodium hydroxide. The oil which separates is extracted three times with benzene and the benzene extracts concentrated on a steam bath and the residues distilled. The N-(p-chlorobenzhydryl)-N'-methylpiperazine product boils at a temperature of 178–181° C. at a pressure of 1.0 mm. The monohydrochloride salt of the product has a melting point of 221–222° C.

EXAMPLE XXXXVII

*N-(p-chlorobenzhydryl)-N'-ethylpiperazine*

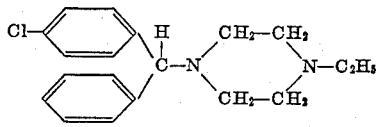

Following the procedure outlined in Example XXXXVI 30 g. of N-(p-chlorobenzhydryl)-piperazine, 5.3 g. of acetaldehyde and 7.6 g. formic acid (90%) are heated on a steam bath for three hours and refluxed for five hours to produce the N'-ethylated piperazine product. The dihydrochloride of the latter product has a melting point of 227–228° C.

By employing the procedures described in Examples XXXXVI and XXXXVII the following methyl and ethyl substituted piperazines are prepared: N-(p-bromobenzhydryl)-N'-methylpiperazine, N-benzhydryl-N'-methylpiperazine, N-(p-methoxybenzhydryl)-N'-methylpiperazine, N-(p,p'-dichlorobenzhydryl)-N'-methylpiperazine, N-benzhydryl-N'-ethylpiperazine, N-(p-iodobenzhydryl)-N'-methylpiperazine, N-[α-(2-pyridyl)-benzyl]-N'-methylpiperazine, N-(p-fluorobenzhydryl)-N'-methylpiperazine, N-(p-methylbenzhydryl)-N'-methylpiperazine, N-(α-cyclohexyl-p-chlorobenzyl)-N'-methylpiperazine, N-(o-chlorobenzhydryl)-N'-methylpiperazine, N-(α-2-thienylbenzyl)-N'-methylpiperazine, N-(m-chlorobenzhydryl)-N'-methylpiperazine, N-(α-2-thienyl-p-chlorobenzyl)-N'-methylpiperazine, N-(α-methylbenzhydryl)-N'-methylpiperazine, N-[α-(2-furyl)-benzyl]-N-methylpiperazine, and N-(α-cyclophenyl)-benzyl-N'-methylpiperazine.

As a modification of the foregoing method of introducing a methyl or ethyl group by reducing an aldehyde, it is possible to effect reduction of the aldehyde with a metal catalyst and hydrogen in place of the formic acid used in Examples XXXXVI and XXXXVII. Thus, for example, zinc and hydrochloric acid are used in a reaction mixture containing benzhydryl piperazine and acetaldehyde to produce the benzhydryl-N'-ethylpiperazine. Similarly, Raney nickel and absolute ethyl alcohol are used in reaction mixture containing benzhydryl piperazine and formaldehyde to introduce the methyl radical into the piperazine ring in a manner similar to that described in the foregoing examples.

This application is a continuation-in-part application of the applicants' co-pending patent application Serial No. 86,394, filed April 8, 1949, now abandoned, which was a continuation in part of the applicants' earlier application Serial No. 52,124, filed September 30, 1948, now abandoned.

Others may readily adapt the invention for use under various conditions of service, by employing one or more of the novel features disclosed or equivalents thereof. As at present advised with respect to the apparent scope of our invention, we desire to claim the following subject matter.

We claim:

1. The process of preparing a compound having the general formula:

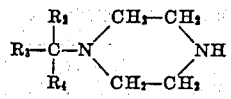

wherein $R_2$ is selected from the group consisting of hydrogen and an alkyl group containing up to four carbon atoms, $R_3$ is a monocyclic aromatic hydrocarbon group having a 6-membered ring, and $R_4$ is a member selected from the class consisting of monocyclic aromatic hydrocarbon group having a 6-membered ring, a pyridyl group, a thienyl group, and a cyclohexyl group; which comprises treating a N-carbalkoxy piperazine with a ($R_2$, $R_3$, $R_4$, C)-halide and subjecting the resulting N-($R_2$, $R_3$, $R_4$, C)-N'-carbalkoxy piperazine to hydrolysis and decarboxylation by contacting with a compound selected from the group consisting of an acidic reagent and an alkaline reagent.

2. A process according to claim 1 wherein hydrolysis and decarboxylation are effected by refluxing the N-($R_2$, $R_3$, $R_4$, C)-carbalkoxy piperazine with hydrochloric acid.

3. A process according to claim 1 wherein hydrolysis and decarboxylation are effected by refluxing the N-($R_2$, $R_3$, $R_4$, C)-carbalkoxy piperazine with potassium hydroxide.

References Cited in the file of this patent

UNITED STATES PATENTS

| | | |
|---|---|---|
| 2,455,949 | Rieveschl | Dec. 14, 1948 |
| 2,508,499 | Rieveschl | May 23, 1950 |
| 2,527,963 | Rieveschl | Oct. 31, 1950 |
| 2,630,435 | Baltzly et al. | Mar. 3, 1953 |

OTHER REFERENCES

Kushner et al.: J. Org. Chem., 13, 144–145 (1948).

Chemical Abstracts, 4th Decennial Index, page 8086 (1937–1946).

Neff: Abstracts of Theses, University of Chicago Science Series, 4, 141–9 (1925–6) (pub. May 1928); see Chemical Abstracts, 22, 3639 (1928).

Lutz et al.: J. Am. Chem. Soc., 68, 2224–7 (1946).

Hamlin et al.: J. Am. Chem. Soc., 71, 2731–4 (1948).

Cromwell: J. Am. Chem. Soc., 69, 1857–60 (1947).